July 14, 1964 H. R. GRUBB 3,141,097

TUNNEL DIODE ADDRESS REGISTER

Filed April 3, 1961 2 Sheets-Sheet 1

INVENTOR
HAROLD R. GRUBB
BY Leo J. Aubel
ATTORNEY

July 14, 1964 H. R. GRUBB 3,141,097

TUNNEL DIODE ADDRESS REGISTER

Filed April 3, 1961 2 Sheets-Sheet 2

United States Patent Office 3,141,097
Patented July 14, 1964

3,141,097
TUNNEL DIODE ADDRESS REGISTER

Harold R. Grubb, Owego, N.Y., assignor to International Business Machines Corporation, New York, N.Y., a corporation of New York Filed Apr. 3, 1961, Ser. No. 100,306
1 Claim. (Cl. 307—88.5)

Figure 1A:
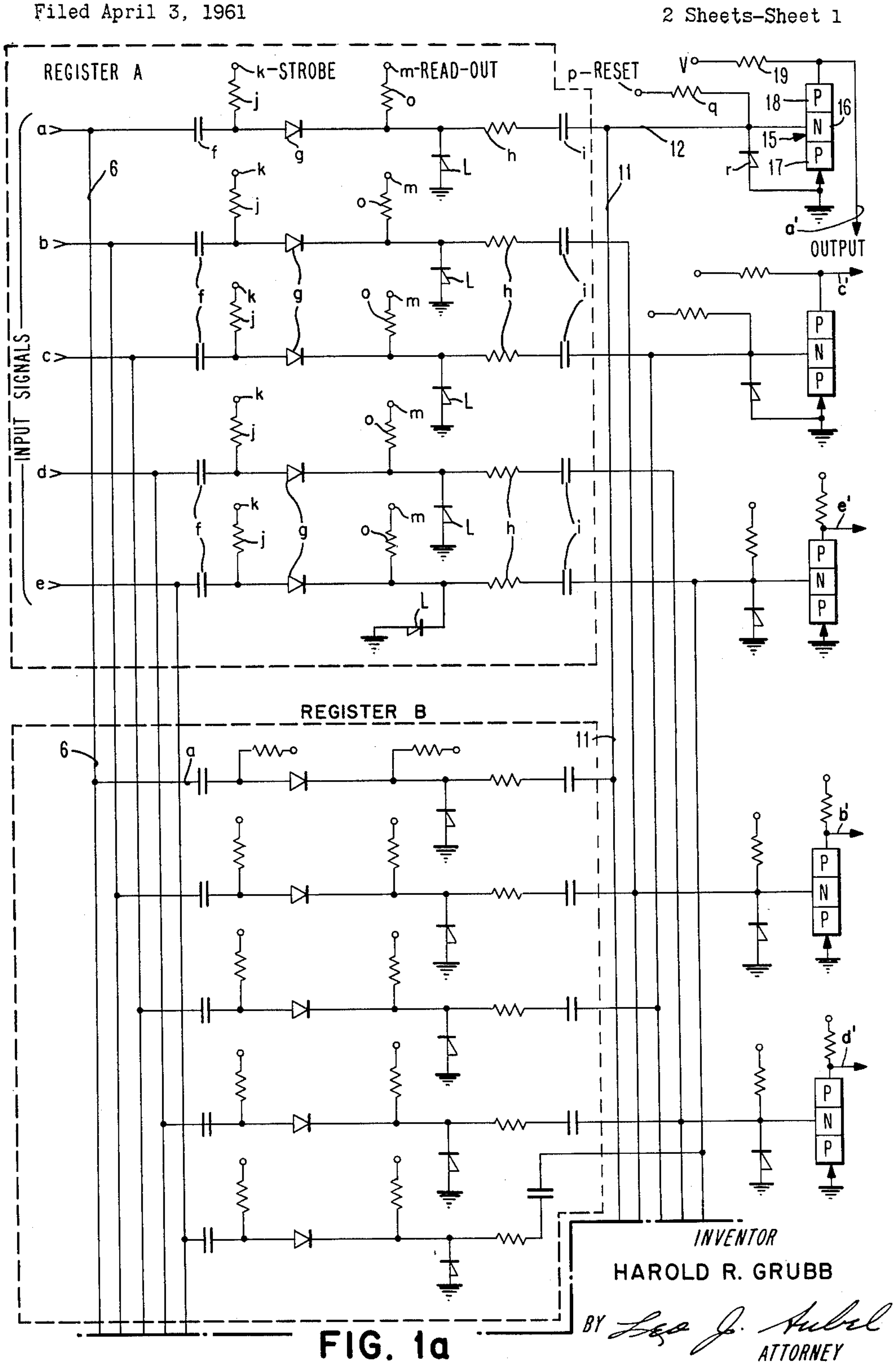

This invention relates to an address register and more particularly to an address register utilizing tunnel diodes as the signal translating devices.

An article in the Physical Review of January 1957 on pp. 603–605, entitled "New Phenomenon in Narrow Germanium P-N Junctions," by Leo Esaki, describes a semiconductor structure now known as the tunnel or Esaki diode. The tunnel diode may be said to be a P–N junction diode wherein both the P region and the N region contain a very high concentration of the respective impurities resulting in current versus voltage characteristics which exhibit a short circuit stable negative resistance region. The tunnel diode may also be defined as exhibiting a first region of positive resistance over a low range of potentials and, adjoining at a peak current value, a second region of negative resistance, and then a third region of positive resistance. Thus, by properly providing potentials to the tunnel diode, a bistable element may be obtained. The response time of the tunnel diode may be in the order of millimicroseconds and its operating potentials are relatively low in the order of 0.05 volt at the beginning of the negative resistance region to 0.5 to 5 volts, depending on the diode material used at the end of the negative resistance region.

It is a principal object of this invention to provide an improved means for addressing a memory matrix.

It is another object of this invention to provide a register for addressing a memory which register utilizes tunnel diodes as the translating devices.

It is another object of the present invention to provide an address register which utilizes tunnel diodes to provide an economical address register.

It has been found that for registers in which the data input is in the range of between 100 or 200 bits, tunnel diode registers are more economical than transistor or core type registers. In the present state of the technology, if the size of the register is larger than 200 bits, it has been found that core type registers are more economical. Therefore, for those registers which must process up to 200 bits of data, tunnel diodes are considered particularly useful.

In one preferred embodiment, the invention provides a plurality of address registers; each of the registers are similar and each comprises data lines for receiving coded input data pulses either serially or in parallel. The corresponding lines in the various registers are connected in parallel to one another. Gate means are provided which enable the incoming code to selectively energize the tunnel diodes in the various lines in response to the input coded data. For each of the lines, read-out control switches each of the tunnel diodes in the input lines to an initial condition to thus read-out the data to an output tunnel diode and transistor latch. The output tunnel diode is connected in common, i.e, in parallel, to corresponding input lines of each of the registers.

Figure 1B:
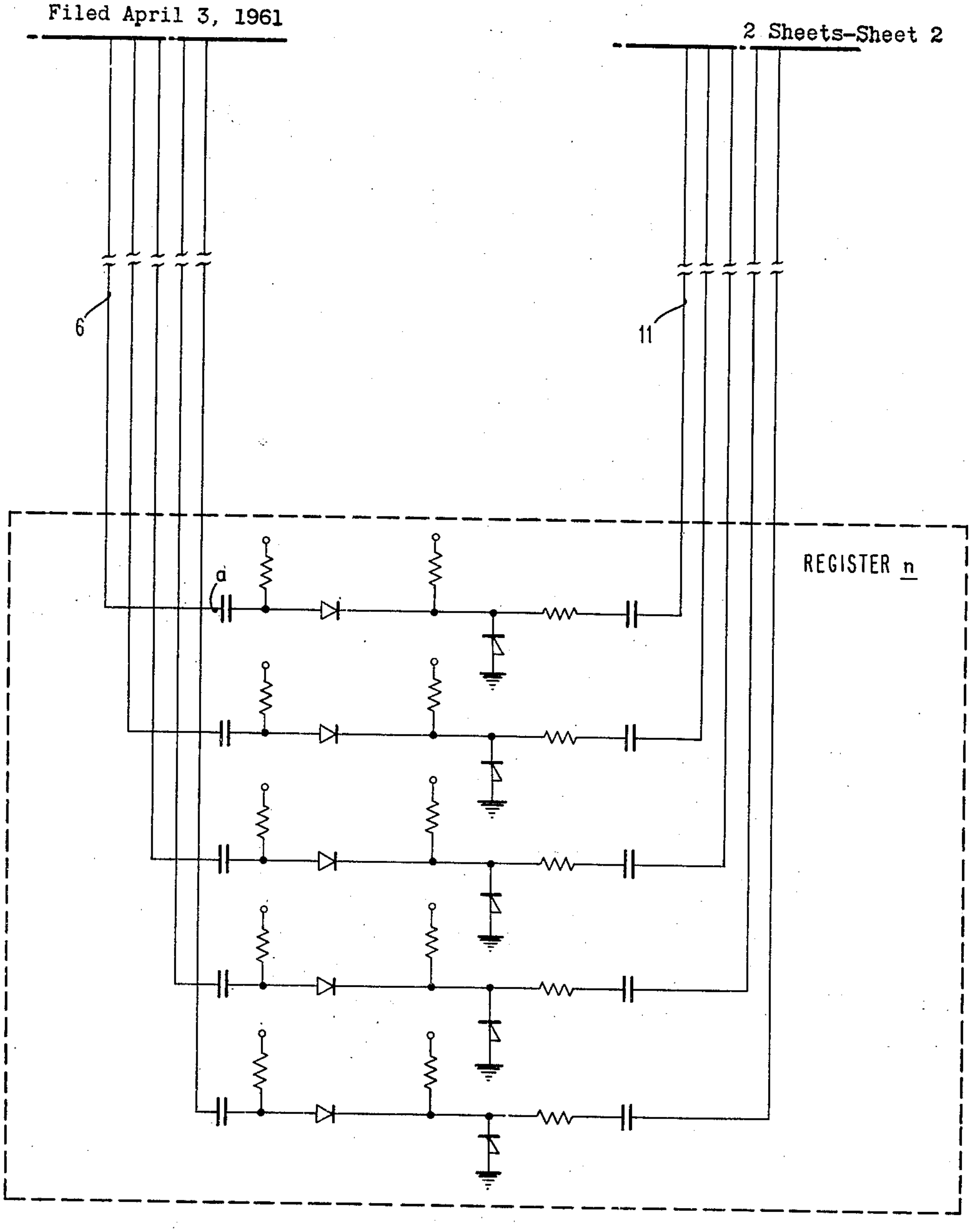

The foregoing and other objects, features and advantages of the invention will be apparent from the following more particular description of preferred embodiments of the invention, as illustrated in the accompanying drawings:

In the drawings:

FIGS. 1*a* and 1*b* are schematic diagrams of a preferred embodiment of the invention.

In the figures, a plurality of similar registers A, B . . . *n* are indicated. The *n*th lettered register indicates that any number of registers may be connected to one another as are the three registers shown in FIGS. 1*a* and 1*b*. The number of registers that can be connected in the foregoing manner is the limitation imposed by the driving voltages. The data processing input lines *a, b, c, d* and *e* of register A are connected in parallel to the corresponding data lines of register B and register *n*. Note, for example, lead 6 which connects line *a* of register A with line *a* of register B and line *a* of register *n*. The number of data input lines in a register may be varied to receive an *x*-out-of-*y* input; the particular embodiment shown is arranged to receive and process a 2-out-of-5 code or a binary coded decimal input. Each of the coresponding data lines *a, b, c, d* and *e* in each of the registers A, B and *n* is connected in parallel to the same output or latch tunnel diode *r*. Note, for example, lead 11 which connects the data line *a* in each of registers A, B and *n* through lead 12 to output tunnel diode *r*; likewise, each of the other data lines are similarly connected in parallel to corresponding output tunnel diodes, not numbered.

Each of the data processing input lines *a, b, c, d* and *e* is similar and comprised of the following: The input data is coupled in series through a capacitor *f*, a diode *g*, a resistor *h* and a capacitor *i* to the associated output tunnel diode and transistor latch, as will be described. The anode of diode *g* is connected to capacitor *f* and the cathode of diode *g* is connected to a resistor *h*. A strobe or gate signal *k* is coupled through a resistor *j* to the junction of capacitor *f* and diode *g*. A tunnel diode L has its cathode connected to the junction of diode *g* and resistor *h*; the anode of tunnel diode L is connected to ground potential. Also, a read-out control signal *m* is connected through a resistor *o* to the junction of diode *g* and resistor *h*.

A common output lead connected to the corresponding input lines on each register, for example note lead 12 which is connected in parallel through lead 11 to the data input lines *a* of the various registers A, B . . . *n* connects to tunnel diode *r* and transistor 15. Transistor 15 in this embodiment is a PNP type having a base 16, emitter 17 and a collector 18. Lead 12 is connected to base 16; the emitter 17 is connected to ground reference; the collector 18 is connected through a resistor to an operating potential V, in this embodiment V is −12 volts, and the output from the data lines *a* is taken from the collector 18. The output from the tunnel diode and transistor latches ascociated with the input lines *a, b, c, d* and *e* are labeled *a', b', c', d'* and *e'*, respectively. The tunnel diode r is connected across the base 16 to emitter 17 of transistor 15. A reset potential *p* is selectively applied through a resistor *q* to the cathode of tunnel diode *r* and the base 16 of transistor 15; the anode of tunnel diode *r* is connected to ground reference. As noted, the data lines, i.e., signal channels, in each of the registers A, B and *n* are similar. Likewise, the output tunnel diode and transistor latches which are connected in parallel to corresponding input lines in the various registers are also similar to one another.

The operation of the circuit is as follows: All the strobes *k* of the register into which information is to be read are activated in parallel. Next an input code is received in the various input lines *a, b, c, d* and *e*; that is, for example, two of the five input lines have a pulse concurrently applied thereto for designating one digit or character of a word in a 2-out-of-5 code. The input varies from −12 volts to 0 volt; i.e., a −12 volts input indicates a "0" bit and 0 volt indicates a "1" bit. The voltage at gates *k* is normally −12 volts and when activated the voltage at gates *k* will be raised to 0 volt to allow the input data to forward bias the respective diode *g* and energize the respective tunnel diode L. As will be appreciated, a "1" bit and "0" bit will set tunnel diode L to its high voltage and low voltage states respectively. Since the diode L is initially biased to a low voltage state, a "0" bit will not change the voltage level and hence no change in output will occur during read-out. For explanation purposes, it will be assumed that a "1" bit is being processed in line *a* of register A; the operation of the other lines in the various register would be identical. The potential at the junction of the tunnel diodes L and diode *g* and resistors *h* and *o* is normally at a −0.45 volt; when the tunnel diode L is set by the input signal indicating a "1" bit, the potential at the foregoing junction will be increased to 0 volt. A potential of −4.5 volts is applied to terminal *m* to maintain a current flow through biasing resistor *o* to provide the proper potentials to tunnel diode L.

During read-out, the voltage at terminal *m* (of each of the five lines in the register which is to be read out) is decreased to −12 volts causing the tunnel diode L to switch or go from ground level to −0.45 volt. This change on the tunnel diode L induces a voltage change on the capacitor *i* causing current to flow from ground reference through the output or latch tunnel diode *r* to set tunnel diode *r* from a 0 volt potential to −0.45 level. As will be appreciated, the voltage change in tunnel diode L is of fairly low magnitude; however, since the diode L switches rapidly (approximately 5 millimicroseconds assuming minimum line inductance) the current flow will be sufficient to set tunnel diode *r*. Resistor *h* prevents the output of one register from resetting another register. As is known, the input and output capacitors *f* and *i* prevent direct current coupling.

When the tunnel diode *r* goes to −0.45 volt, it biases transistor 15 to conduction which, in turn, provides a 0 voltage output as its collector 18. As indicated above, the operating potential V coupled through resistor 19 to collector 18 is a −12 volts, hence the transistor 15 provides a voltage excursion or output of from −12 volts to zero (0) volt.

The tunnel diode *r* has a potential *p* applied thereto through resistor *q*. In this embodiment, the potential at terminal *p* is normally at −6 volts. When it is desired to reset the tunnel diode and transistor latch, the potential applied to point *p* is increased to a +3 volts. This increase in voltage causes the tunnel diode *r* to go from −0.45 volt to ground or 0 potential level thus cutting-off transistor 15.

As can be appreciated, the tunnel diode *r* and transistor 15 which comprise a latch circuit can be activated by any one of the data lines connected in common thereto. Information in one register can thus be read-out without disturbing the information in the other registers.

The voltage levels indicated above are those employed in one practical embodiment; however, the voltages indicated should not be considered as limiting the concept of the invention.

In what can be considered a second embodiment of the invention or more correctly merely a modification of the first embodiment, a negative signal may be processed to provide a negative signal output. In the modified circuit, the polarity connections of the tunnel diodes L, *r* and diode *g* are reversed, and an NPN transistor is employed. The operating voltage levels are changed as is known in the art to accommodate the change in polarity of the diodes and the use of an NPN transistor. The same principles of operation would apply as in the circuit shown; the voltage excursions would be opposite to those described above.

While the invention has been particualrly shown and described with reference to preferred embodiments thereof, it will be understood by those skilled in the art that the foregoing and other changes in form and details may be made therein without departing from the spirit and scope of the invention.

What is claimed is:

An addressing circuit comprising, in combination, an input capacitor, a unilateral conducting device, a resistor and an output capacitor connected in series with one another; an input tunnel diode having one terminal connected to the output side of said unilateral conducting device and being energizable to a first or a second stable voltage level in response to binary data; means for applying a biasing voltage to said unilateral conducting device on the input side of said device for controlling the conducting condition thereof and hence the coupling of said input binary data to said input tunnel diode; a read-out means connected to said tunnel diode for returning said tunnel diode to its first level; an output latch comprising an output tunnel diode having first and second stable voltage levels and a transistor having an input and an output portion; said output tunnel diode in said latch being connected across the input to said transistor for selectively biasing said transistor to an initial and a second conducting condition; the output capacitor being connected to said latch; said input tunnel diode when reset from its second voltage level to its initial voltage level causing a current to flow through said output tunnel diode thereby changing the voltage level of said output tunnel diode to bias said transistor to its second conducting condition; and, reset means for resetting said output tunnel diode to its first voltage level to latch said transistor to its initial conducting condition.

References Cited in the file of this patent

UNITED STATES PATENTS 2,903,513 Phelps et al. ............ Sept. 8, 1959

OTHER REFERENCES

Chow et al.: AIEE Conference Paper No. CP 60–297, January 1960, page 29.

Electronics, McGraw-Hill, Nov. 27, 1959, issue pages 60–64.

Electronic, McGraw-Hill, August 1960, issue pages 59–61.

IBM Tech. Bulletin, vol. 2, No. 6, April 1960, page 73.

IBM Tech. Bulletin, vol. 3, No. 8, January 1961, page 38.